(12) United States Patent
Smith

(10) Patent No.: US 10,075,850 B2
(45) Date of Patent: Sep. 11, 2018

(54) METHOD AND SYSTEM FOR WIRELESS ATTACK DETECTION AND MITIGATION

(71) Applicant: THE BOEING COMPANY, Chicago, IL (US)

(72) Inventor: Brian J. Smith, Peyton, CO (US)

(73) Assignee: The Boeing Company, Chicago, IL (US)

(*) Notice: Subject to any disclaimer, the term of this patent is extended or adjusted under 35 U.S.C. 154(b) by 153 days.

(21) Appl. No.: 14/970,353

(22) Filed: Dec. 15, 2015

(65) Prior Publication Data
US 2017/0171757 A1 Jun. 15, 2017

(51) Int. Cl.
*H04L 29/06* (2006.01)
*H04W 12/12* (2009.01)

(52) U.S. Cl.
CPC ......... *H04W 12/12* (2013.01); *H04L 63/1416* (2013.01); *H04L 63/1425* (2013.01); *H04L 63/1441* (2013.01)

(58) Field of Classification Search
CPC . H04W 12/12; H04L 63/1441; H04L 63/1416
See application file for complete search history.

(56) References Cited

U.S. PATENT DOCUMENTS

| | | | | |
|---|---|---|---|---|
| 5,999,127 A * | 12/1999 | Dezelan | ............. | H04B 7/18521 342/352 |
| 7,277,404 B2 * | 10/2007 | Tanzella | ............. | H04L 41/0681 370/277 |
| 7,295,831 B2 * | 11/2007 | Coleman | ................ | H04B 7/086 455/13.3 |
| 7,953,389 B2 * | 5/2011 | Coleman | ................ | H04B 7/086 455/13.3 |
| 2003/0135762 A1 * | 7/2003 | Macaulay | ........... | H04L 63/1466 726/22 |
| 2005/0037733 A1 * | 2/2005 | Coleman | ................ | H04B 7/086 455/411 |
| 2006/0123133 A1 * | 6/2006 | Hrastar | ............... | H04L 63/1408 709/238 |
| 2008/0102797 A1 * | 5/2008 | Coleman | ................ | H04B 7/086 455/411 |
| 2009/0119741 A1 * | 5/2009 | Palnitkar | ................ | G06Q 20/40 726/1 |
| 2010/0100930 A1 * | 4/2010 | King | ................... | H04L 63/1433 726/1 |
| 2010/0296496 A1 * | 11/2010 | Sinha | .................... | H04W 12/12 370/338 |

* cited by examiner

Primary Examiner — Mahfuzur Rahman
(74) Attorney, Agent, or Firm — Francisco A. Rubio-Campos; Apogee Law Group P.C.

(57) ABSTRACT

A method and system for detection and mitigation of attacks on a wireless network. The wireless network includes a plurality of antennas that are associated with different directions of coverage. The antennas can include an antenna array or an antenna having beamforming capabilities. An intrusion prevention processor or device analyzes incoming signals and determines individual device or aggregate device behavior patterns. The behavior patterns are compared with known attack patterns or triggers to determine if an anomaly has occurred. Attacking signals are blocked, or antennas in the direction of the anomaly are disabled while the system stabilizes. If the system stabilizes and the anomaly clears, the antennas are enabled and monitoring continues.

18 Claims, 4 Drawing Sheets

METHOD AND SYSTEM FOR WIRELESS ATTACK DETECTION AND MITIGATION

BACKGROUND

1. Technical Field

The disclosure generally relates to a method and system for detecting attacks on a wireless network and ways of mitigating the effects of such attacks.

2. Related Art

Civil society and governments are becoming increasingly dependent on the availability of high speed cellular services. This dependency also extends to emergency response and military operations. In general, commercial-off-the-shelf (COTS) wireless systems have attractive characteristics and cost points. However, because these systems are so readily accessible to all users, there remains the risk of attacks that can disrupt or compromise network access delivered by these services. Security threats to compromise or disrupt IEEE 802.11 wireless networks have long been recognized. As a result, some robust protocol security measures have been added, but product and protocol vulnerabilities continue to be found. Therefore, the lag between zero day attacks and patches, which are common in network security, remains as a problem.

Commercial Wireless Intrusion Prevention Systems (WIPS) are currently offered in the market for IEEE 802.11 wireless networks. These tools attempt to recognize a variety of wireless network attacks, and then alert administrators, and may prevent intrusions. IEEE 802.11 WIPS systems typically focus on detecting network intrusion attempts, and protocol based Denial of Service (DoS) attacks, but may also monitor radio frequency (RF) signals to detect unintentional or jammer interference in the band. Intrusion attempts are often detected by comparing protocol transactions with a database of known attack signatures. This is a useful approach that can detect recent zero day attacks in a relatively quick manner.

IEEE 802.11 wireless Denial of Service (DoS) attacks typically focus on flooding an Access Point with frames, e.g. connection requests, and IPS products focus on recognizing this. They may also detect injected wide band RF noise as an attack, but this seems to be a less common attack vector. 802.11 IPS product RF jamming detection does not appear to look for injected RF noise or invalid data into specific portions of wireless data frames. This type of narrowly focused jamming attack requires less RF power than creating noise across the whole band and is difficult to detect.

In the Metropolitan Area Network (MAN) cellular arenas, Long Term Evolution (LTE) networks, LTE Advanced standards and IEEE 802.16 standards (for example) have had many security protections designed into them. However, even with security controls built into such protocols, vulnerabilities still remain that can lead to disruptive physical layer/media access control (PHY/MAC) attacks. In particular, intrusion detection and prevention products exist for IEEE 802.11 wireless LANs, but they have a limited ability to detect and mitigate PHY/MAC attacks, such as jamming. In particular, intrusion detection and prevention products exist for IEEE 802.11 wireless LANs, but they have a limited ability to detect and mitigate PHY/MAC attacks, such as jamming. Out of the various types of cellular attacks, a RF jamming based DoS attack is one of the most troublesome.

Because of the purpose of cellular networks, attack motivations may be different than for IEEE 802.11. Unlike with IEEE 802.11, an LTE attacker does not gain access to protected business or home networks, although they may compromise packet data of individual subscribers. Rather, if the motivation is to harm many subscribers, attacks are more likely to be intended to disrupt network services for subscribers. For example, an RF based DoS attack is sometimes difficult to avoid, since for public devices that request joining a cell, some necessary cell information is not protected. This enables an attacker to configure a device to target specific portions of RF frames to disrupt service for the entire cell, without the necessity for a high power, broadband jammer. The use of a low power jammer also makes the attacker more difficult to detect and locate. Base Stations may also be spoofed in a DoS attack. If an attacker gains access to an LTE network, there are a variety of Internet Protocol (IP) based attacks that may disrupt the system or compromise data in other packet flows. Spoofing attacks also exist in which an attacker spoofs the identity of a valid subscriber's mobile device for the purpose of avoiding service charges.

One solution might be to make the devices and/or standards more complex in order to combat the attack problem. There are practical limits however on what the market will bear in terms of device complexity to further mitigate these attack vectors. In the cellular area, User Equipment (UE) is a consumer driven market, and demand is driven by cost, size, data rates, and battery life. A balance must therefore be found between increased UE complexity and the security protocols that are appropriate for the market.

Additionally, as new vulnerabilities are discovered, the time necessary to implement changes or mitigations within the various standards protocols can be lengthy. For instance, specific LTE vulnerabilities have been identified in the field, and standards protocol changes have already been suggested to address the vulnerabilities. However, there are often significant technical impacts which make implementation of such protocol changes unlikely or questionable. Standards are generally developed with many different companies involved. The different companies contribute their expertise and ideas, and any changes to the protocol must pass through many technical reviews and committees for acceptance.

Thereafter, even if agreement can be reached regarding a standards protocol change, the approval process for changing or modifying the underlying product that implements the protocol can often be very long. Design and manufacturing changes require sufficient lead time to modify hardware designs and/or production lines that are producing the affected devices. Additionally, the approval process behind the product development cycle may cause a long lag between discovery of the attack and the subsequent resolution. This lag time can thereby create a large time window of vulnerability for attacks while a counter-attack solution is being implemented.

Software or firmware changes can sometimes be made more quickly, but even those changes must be developed and approved by companies and/or standards organizations. After development and approval, the software/firmware changes must be pushed out to the various devices that require such modifications. Maintaining backward compatibility with fielded devices is another consideration. This operation often requires significant data bandwidth, and also requires downtime for the receiving devices while the software/firmware is being updated.

Accordingly, what is needed in this field of technology is a method for attack detection and mitigation that is able to respond to emerging attacks, but without reliance upon enhancements or modifications to hardware and/or software, and without reliance upon changes to underlying protocol security.

SUMMARY

An attack detection and mitigation method and system are described which can be applied to wireless networks, such as LTE. In particular, this disclosure describes a method and system which builds upon general concepts developed for network Intrusion prevention systems (IPS) to adaptively mitigate detected PHY/MAC attacks, including jamming, as they occur. This method and system can be extended to cover other types of attacks, and can be applied to various other types of wireless network technologies in general.

In one example, a representative method is provided for mitigating an unwanted transmission to a wireless network, the wireless network including an antenna array with a plurality of antennas associated with different directions, the antenna array configured to send and receive signals from external devices using established protocols, and a processing device coupled to the antenna array for monitoring and analyzing incoming signals, the method comprising: (a) receiving at least one incoming signal at the antenna array from the external devices; (b) monitoring and analyzing the at least one incoming signal; (c) determining whether the at least one incoming signal is an anomaly that violates the established protocols; (d) reporting the anomaly; (e) determining which antenna in the antenna array is receiving the anomaly; and (f) if an external device, of the external devices sending the anomaly, can be blocked, then (1) blocking the external device, otherwise (2) disabling at least one antenna in the antenna array that is receiving the anomaly.

In another example, a method is provided for minimizing an unwanted transmission to a wireless network, the wireless network including at least one antenna having beamforming capabilities, the antenna configured to send and receive signals from external devices using established protocols, and a processing device coupled to the antenna for monitoring and analyzing incoming signals, the method comprising: (a) receiving at least one incoming signal at the least one antenna from the external devices; (b) monitoring and analyzing the at least one incoming signal; (c) determining whether the at least one incoming signal is an anomaly that violates the established protocols; (d) logging the anomaly and reporting the anomaly; (e) using the beamforming capabilities of the antenna to determine a direction of the external device that is sending the anomaly; and (f) if an external device, of the external devices sending the anomaly, can be blocked, then (1) blocking the external device; (2) disabling a receiving of incoming signals in a direction of the anomaly using the beamforming capabilities of the antenna.

In another example, a system is provided for mitigating the reception of unwanted signals in a wireless network from external devices, the system comprising: at least one antenna for receiving incoming signals associated with a transmission direction; a mechanism for disabling at least a portion of the at least one antenna associated with the transmission direction; a processor coupled to the at least one antenna for analyzing the incoming signals, the analysis including behavior patterns of the external devices; and a storage device for including behavior patterns of the external devices and signature patterns of unwanted signals, wherein the behavior patterns of the external devices are compared to the signature patterns of the unwanted signals to determine if an anomaly has occurred, and at least a portion of the at least one antenna is disabled in a direction associated with the anomaly.

Other devices, apparatus, systems, methods, features and advantages of the disclosure will be or will become apparent to one with skill in the art upon examination of the following figures and detailed description. It is intended that all such additional systems, methods, features and advantages be included within this description, and be protected by the accompanying claims.

BRIEF DESCRIPTION OF THE FIGURES

The present disclosure may be better understood by referring to the following figures. The components in the figures are not necessarily to scale, with emphasis instead being placed upon illustrating the principles of the disclosure. In the figures, reference numerals designate corresponding parts throughout the different views.

DETAILED DESCRIPTION

Figure 1:
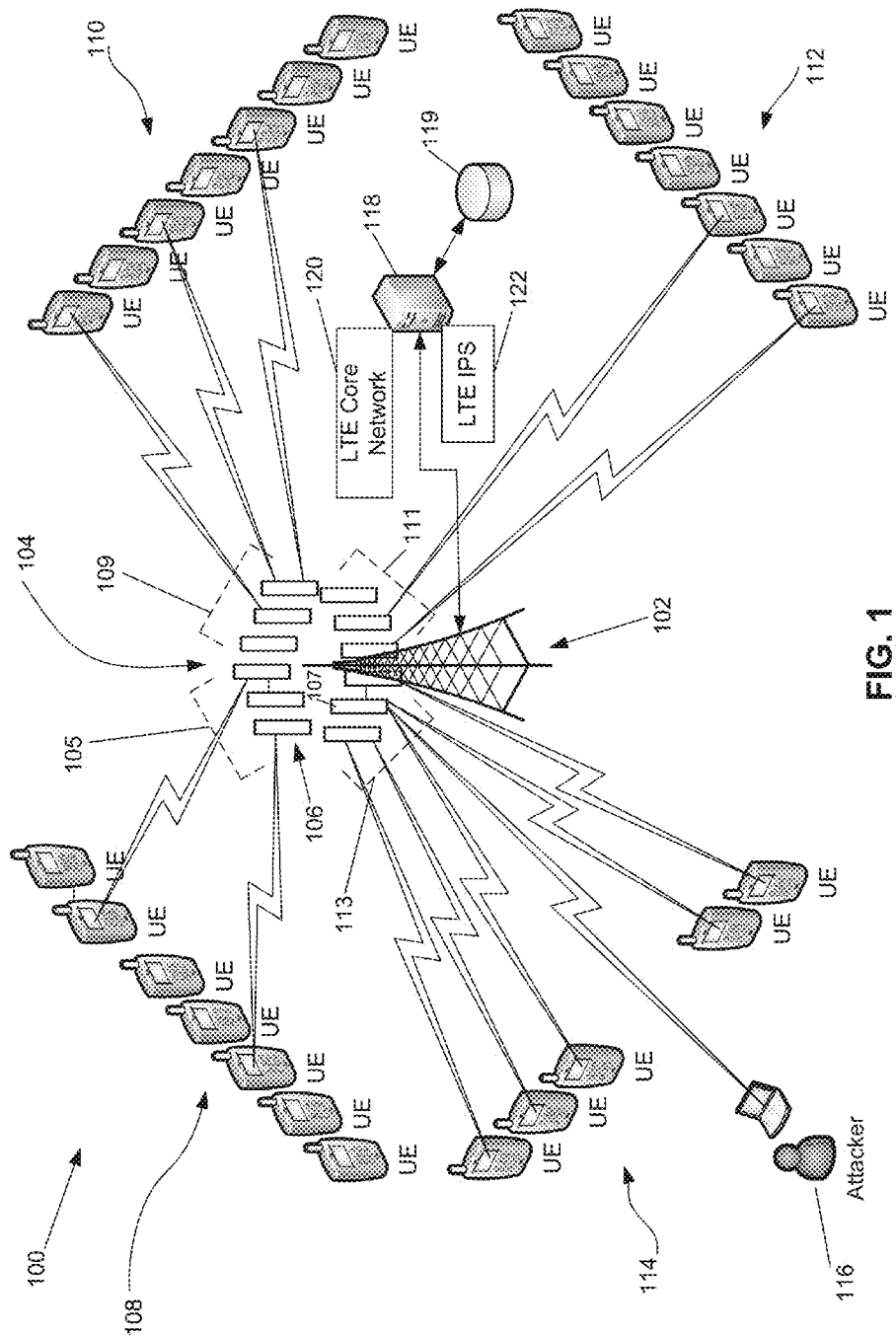
FIG. 1 shows a representative wireless network having an array of antennas and an attacker that is detected by an antenna in the general direction of the attacker.

The described method can be applied to any of a variety of wireless networks, including for instance LTE, WiMAX, and other standardized formats such as IEEE 802.11. Various forms of intrusion detection and prevention systems exist, for wireless LANs and the like, but they have a limited ability to detect and mitigate attacks. The method and system described herein provides the ability to detect and mitigate attacks at the PHY/MAC level, including for example jamming.

In general, the open and exposed nature of wireless networks leads them to be more vulnerable to various types of attacks. In a cellular network, for example, an attacker can inject traffic into the network without even having initial credentials. An attacker with a low-power device can electronically sniff and find vulnerability points, and inject noise or malicious data at that point. Denial of Service (DoS) attacks are one of the most common, wherein the attacker is trying to prevent legitimate users from accessing the network. DoS attacks can be executed in many ways, such as using intentional interference, or actual jamming. In general, jamming denies service to authorized users by interfering with valid wireless transmissions. The legitimate traffic is jammed by frequencies coming from illegitimate traffic, wherein those unwanted frequencies overwhelm valid signal reception for the device. One such jamming approach is to send random unauthenticated packets to every wireless station in a network. To minimize the effect of the jamming, and to prevent an unintentional disruption, the present method serves to identify the presence and general direction of such jamming signals.

Jamming can make itself known at the physical layer of the network, more commonly referred to as the PHY layer, or at the Media Access Control layer, more commonly referred to as the MAC layer. For the purposes of this description, these layers will be collectively referred to as PHY/MAC. Physical or radio jamming in a wireless medium is a simpler form of DoS attack, but still very disruptive. These attacks are launched by either the continuous emission of radio signals, or by sending random bits into the radio channel. Such jammers can effectively deny access to the channel by monopolizing the wireless medium.

Virtual jamming will occur at the MAC layer. In IEEE 802.11 based MAC protocols, for instance, virtual carrier sensing is used at the MAC layer to determine the availability of the wireless medium. Jamming can be launched at the MAC layer, for example, through attacks on the Request to Send (RTS), Clear to Send (CTS), or data frames. From a network attacker's standpoint, one significant advantage of MAC layer jamming is that the attacker consumes less power in targeting and implementing these attacks as compared to physical radio jamming. In LTE, for example, a cell base station sends data in RF frames, to all devices, that are necessary for a UE device to synchronize with and connect to the cell. This data is not protected and the UE device has not been authenticated at that point. An attacker can then use that data to generate malicious data into select portions of these frames which can disrupt the cell.

Regardless of the type of attack employed, the present disclosure serves to provide a method and system for counteracting such attacks. FIG. 1 shows a representative wireless network 100 that includes a base station 102. In this particular example, the base station includes an antenna array 104 that further includes a plurality of individual antennas 106. This base station might include, for example, an LTE eNodeB base station with a corresponding antenna array. Each of the antennas 106 point in a different general direction, and the collective array 104 is meant to provide coverage for the reception and transmission of signals from many directions around the base station 102. In this example, twelve antennas are shown, and therefore each antenna would generally cover around 30 degrees of radial coverage around the base station 102.

Any of a variety of different external devices might be used to transmit to the wireless network. In this example, these devices are representatively referred to as UE (User Equipment) devices. Again, the nature of such wireless networks is for them to be open and exposed to incoming traffic. Accordingly, a representative first set of UE devices 108 are shown transmitting and receiving signals to a set of antennas 105 that are oriented in the direction of the devices 108. A representative second set of UE devices 110 are shown transmitting and receiving signals to a set of antennas 109 that are oriented in the direction of the devices 110. A representative third set of UE devices 112 are shown transmitting and receiving signals to a set of antennas 111 that are oriented in the direction of the devices 112. Similarly, a representative fourth set of UE devices 114 are shown transmitting and receiving signals to a set of antennas 113 that are oriented in the direction of the devices 114. In this example, each of the four sets of antennas 105, 109, 111, and 113 would cover approximately 90 degrees around the base station 102, with the collective set covering the full 360 degrees.

The representative fourth set of devices 114 also includes an attacker 116. The attacker could be sending the attack signals from any of a variety of devices, including a cellphone, computer, or computer system that has been configured to send out jamming, interfering, or other such signals. In this instance, individual antenna 107, which is part of the antenna set 113, is oriented to receive the signals coming from the attacker 116.

The wireless network 100 also includes a processing device 118 which would be under the general control of a network administrator. The processing device would be coupled to the antennas of the base station 102, and would handle any of a variety of tasks. One such task would include the receipt, collection, and analysis of the incoming signals coming from the various UE devices. In this LTE example, the processing device can serve as the LTE core network 120, and can implement an intrusion prevention system (IPS) 122. The IPS 122 can be configured to monitor and store the individual UE's and the overall connection patterns. A representative database or storage device 119 is shown associated with the processing device 118. If a specific attack pattern is recognized, then the IPS can try to block the UE that is associated with the attacking pattern. Alternatively, the IPS can disable the individual antenna, or set of antennas, that might be associated with receiving the attacking signal. In the example shown, antenna 107 would be disabled since it is the one pointed in the direction of the attacker 116, and antenna 107 is receiving the unwanted attacking signals. The antenna 107 can be disabled for a certain amount of time, while the network continues to monitor incoming signals. If the network stabilizes and/or no further attacking or anomalous signals are detected, then the antenna can be subsequently enabled. Thereafter, the monitoring will resume in case new attacks occur, which also might need to be mitigated.

Additionally, the overall connection patterns of all UE devices can be monitored and modeled and stored. If a significant change in the overall connection pattern reaches a predetermined trigger point, then the IPS 122 can start to disable antenna elements one by one, or set by set, or group by group, or in any combination thereof. The system will continue to monitor incoming traffic to see if the attack resumes, or if other attacks manifest themselves. In either instance, the general direction of the attacker can be derived from the orientation of the affected antennas, and this information can be logged and reported back to the network administrator. A team can then be deployed to further locate and disable the attacking device using, for instance, RF scanners and other means for isolating the location of a transmitting device. The team might use radio sniffers or the like to look for transmission of higher amplitudes, frequency floods, unreasonable numbers of access requests, or anything else that might appear to be anomalous in the direction of the attacking transmission.

Figure 2:
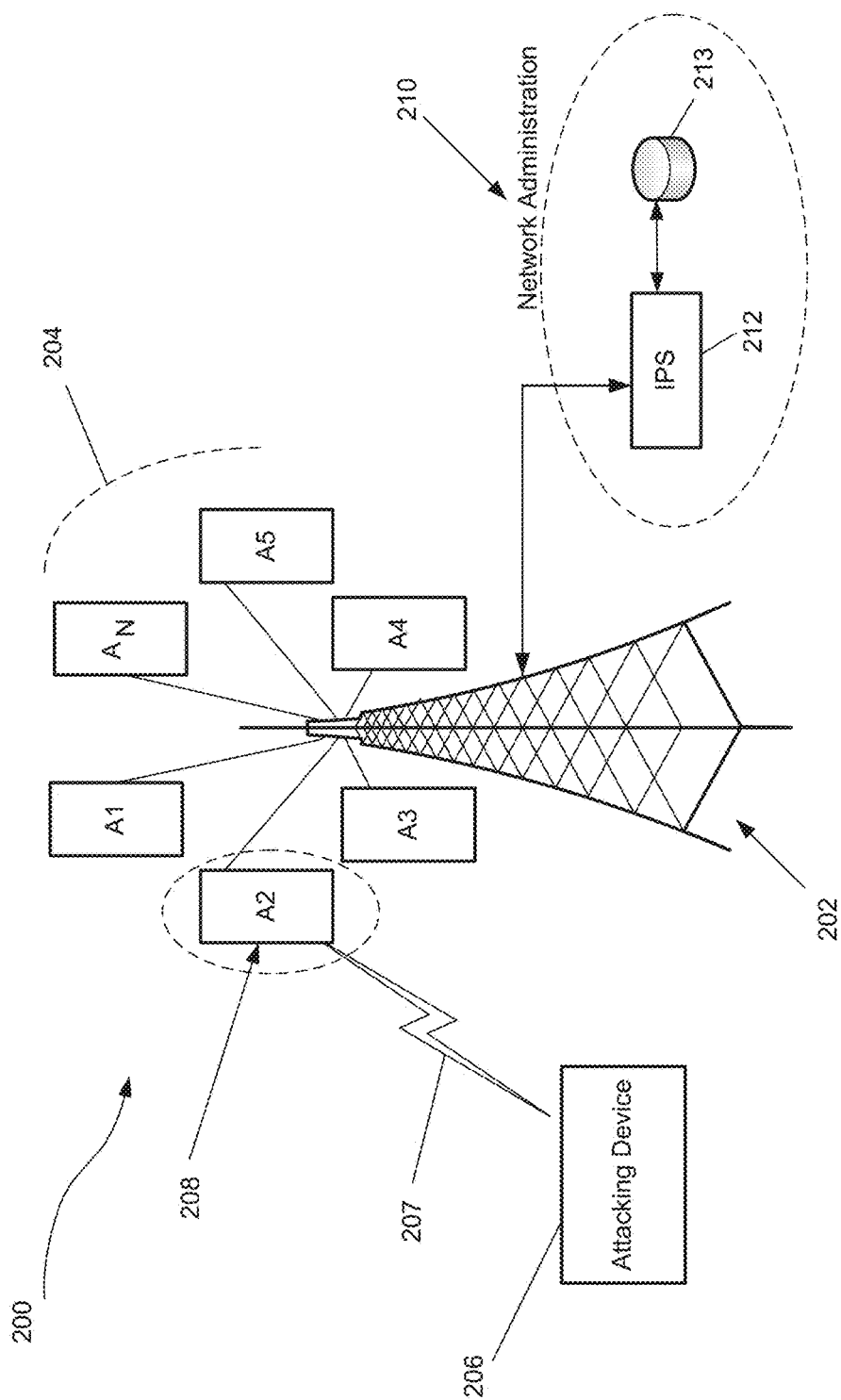
FIG. 2 shows a representative base station having an array of antennas and an attacker, with the antenna being disabled in the general direction of the attacker.

FIG. 2 shows another representative example of a wireless network or system 200 for receiving and processing incoming signals from external devices. A base station 202 is shown having a collection of N antennas ($A_1$ through $A_N$), with each antenna oriented to send and receive signals from a different direction. In this example, the attacking device 206 is shown sending an unwanted signal 207 into the wireless network 200. Antenna A2 (208) is oriented in the direction to receive the attacking signal 207. A representative network administration 210 is shown, which will include at least one processing device for handling various administrative tasks. In this example, an IPS device 212 is shown interacting with the base station 202 and antennas 204. Similar to the procedure and process described for FIG. 1, the IPS 212 can be configured to analyze the incoming signals coming from various external devices and determine whether an attack or anomaly has occurred. The IPS 212 can collect and model behavior patterns for individual devices, and/or collect and model behavior patterns for the aggregate of devices trying to access the network 200. A storage device 213 is shown for storing the patterns and models, and providing ready access to such patterns for comparison against the incoming signals 207. If it is determined that signal 207 is an unwanted or attacking signal, then antenna A2 (208) can be disabled while the other antennas remain active. If it is determined that entire network 200 is being attacked by aggregate attacking signals, then other antennas (A1-$A_N$) can also be shut down according to the patterns detected. The antenna shutdown can occur for a pre-determined period of time, or until the network has stabilized and the attacking signal is no longer detected. This will provide minimal impact to the overall network or system 200, yet eliminate the entry point (or antenna) being utilized by the attacker 206. The direction of the attacker 206 is thereby easily derived, and location or resolution teams can act accordingly.

Figure 3:
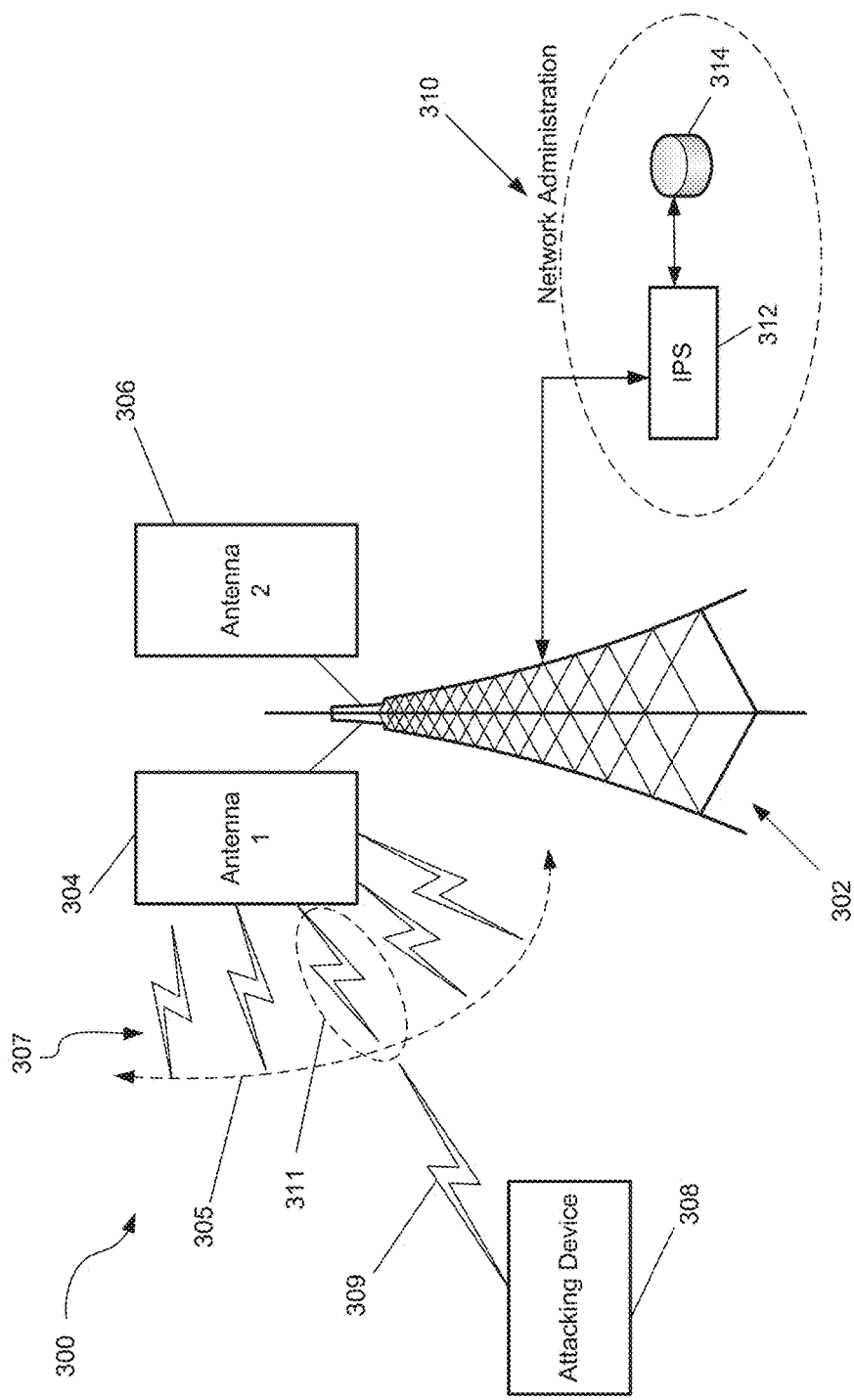
FIG. 3 shows a representative base station having antennas with beamforming capabilities and an attacker, with the beamforming antenna being disabled in the general direction of the attacker.

FIG. 3 shows another representative example of a wireless network or system 300 for receiving and processing incoming signals from external devices. In this configuration, the base station 302 includes a first antenna 304 and a second antenna 306 that are capable of beamforming. Beamforming, or spatial filtering, is a signal processing technique used in sensor arrays for directional signal transmission or reception. In general, this is achieved by combining elements in a phased array in such a way that the signals at particular angles experience constructive interference, while others experience destructive interference. Beamforming can be used at both the transmitting and receiving ends of an antenna in order to achieve spatial selectivity. With beamforming, the antenna can selectively cover a wide range of directions without moving the antenna, and without requiring as many antennas in the array.

In the example, the attacking device 308 sends out an unwanted or interfering signal 309 towards the first antenna 304. The beamforming on the antenna 304 has been configured to sweep and sense signals across a range of directions, as shown by the representative arc 305, with different beamformed signals across the range being shown as 307. The attacking signal 309 is shown interacting with the antenna 304 in the direction of beamformed signal 311.

The network administration 310 of the system will include at least one processing device 312 and a storage device 314. In this instance, the processing device is shown as an IPS 312 which serves to receive, analyze, and characterize the behavior patterns of the various external devices or user devices. As described previously, the IPS 312 can analyze and store behavior patterns and models for individual external devices. The IPS 312 can also analyze and store behavior patterns and models of the aggregate set of external devices that interact with the wireless network 300. The IPS 312 can be configured to recognize an anomaly by comparing incoming signals against individual patterns or aggregate patterns of known unwanted behavior. Trigger points can be determined and set based upon known attack signatures and system constraints. If the trigger point is reached, then an anomaly has been detected and further actions can be taken to mitigate the affect of the attacking signal on the overall system 300.

In this example, the antenna 304 is capable of beamforming, and therefore the direction of the incoming attack signal 309 can be determined via the direction of its detection in the signal sweep 305. If the attacking signal 309 can be blocked, the network administrator will do so. Otherwise, the attacking signal can be eliminated from the beam sweep 305 by shutting down or disabling the sweep in the general direction of the attacking signal. Alternatively, the attacking signal can be specifically notched out of the signal sweep, and therefore it will not cause further problems on the receiving network 300. The antenna beam sweep can be disabled or notched for a certain amount of time, in order to determine if the system will stabilize or if the anomaly has discontinued. If the system has stabilized, then the administrator can reset the anomaly conditions for the network, and the antenna can be turned back on to full sweep (or un-notched) functionality.

Figure 4:
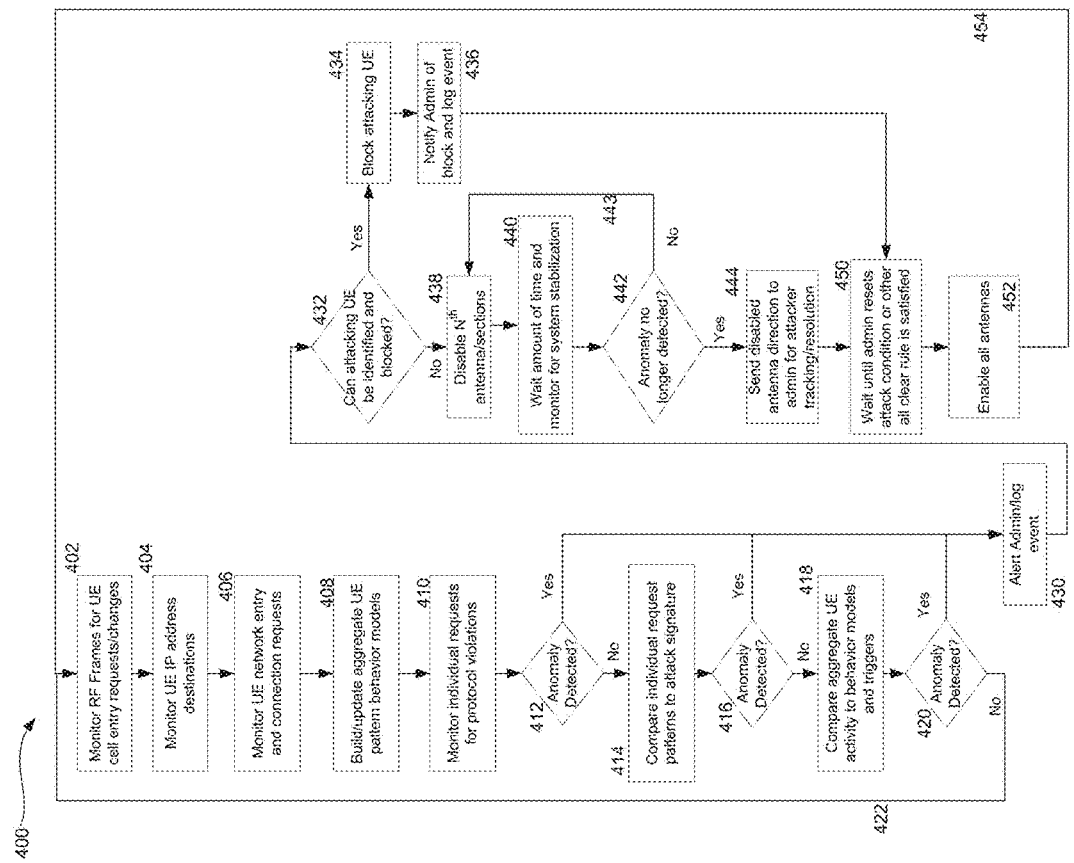
FIG. 4 shows a representative flow chart of steps applied to a wireless network system (or systems) for detecting and mitigating attacks on the network.

FIG. 4 shows a flowchart of representative steps 400 that might be used in a method (or methods) to mitigate the effects of an unwanted or attacking signal in a wireless network. While the flowchart describes a set of connected steps that cover the entire flow shown, the methods disclosed herein are also meant to include subsets and variations of the entire flow shown. The flowchart steps 400 are also meant to apply to any of a variety of wireless networks. The particular example shown generally pertains to LTE networks and devices.

Step 402 shows the initial process of monitoring the RF frames for the various UE (or external device) cell requests and changes. The wireless network will be open and exposed for connections by various UEs, and each UE should be monitored, either individually or in the aggregate. Step 404 next shows the process of monitoring the UE IP address destinations. This IP addresses can assist in developing behavior models, and also assist in tracking down potential attackers. Step 406 shows the process of continuing to monitor the UE network and entry connection requests. The more information that is collection, the more effective the detection process will be for identifying anomalies.

Step 408 next shows the process of building and updating aggregate UE patterns and behavior models. Analyzing and building models of the aggregate behavior of all UEs that are contacting the wireless network will be important in determining complex attack signatures that involve many different external devices or UEs. Step 410 shows the process of monitoring individual requests for protocol violations. Individual violations are relatively easier to detect, but also must be monitored and compared to known attack signatures.

Decision step 412 is the initial analysis point for detecting whether or not an anomaly has occurred. If yes, then the network administrator is alerted and the anomaly event is logged in step 430. Step 414 shows the process of comparing the individual request patterns to known attack signatures, which would include unexpected protocol sequences. Decision step 416 is the analysis point for determining if an anomaly has occurred in an individual request. If yes, then the network administrator is alerted and the anomaly event is logged in step 430. Step 418 shows the process of comparing the aggregate UE activity against built up behavior models. The analysis determines if certain violations have occurred, of if trigger points have been reach. Decision step 420 is the analysis point for determining if an anomaly has occurred in the aggregate UE behavior patterns. If yes, then the network administrator is alerted and the anomaly event is logged in step 430. If no anomaly is detected at this stage, then the process loops back up (via 422) to the monitoring step 402, and the steps continue again.

If an anomaly has been detected in decision steps 412, 416, or 420, the next step is to alert the administrator and log the event per step 430. After step 430, decision block 432 asks whether or not the attacking UE can be identified and blocked. If yes, then that particular UE is blocked as an attacking device in step 434. The network administrator is then notified of the blocking action, and the event is logged in step 436. The method then moves to step 450 wherein the process waits for the administrator to reset the attack condition, or otherwise establish whether an 'all clear' rule has been satisfied.

If the attacking UE cannot be blocked per decision block 432, then the next step 438 is to disable certain (Nth) antenna sections or beam sweep portions. Per the descriptions above, the Nth antenna section to be disabled would be in the direction of the attacking signal. The number of antennas, or antenna sets, or antenna groups to be disabled would depend on the particular antenna array configuration. For beamforming antennas, the portion of the beam would be disabled, or notched out, in the direction of the attacking signal. Step 440 shows the process of waiting a certain amount of time (for instance, a certain amount of seconds) in order to monitor the system for stabilization. The amount of time is dependent upon the user preference and network configuration. Decision step 442 is the analysis point for determining if the anomaly is no longer detected. If an anomaly condition still exists, then the process loops back up (via 443) to step 438. Steps 438 and 440 are thereby repeated until an anomaly is no longer detected.

When the anomaly is no longer detected in decision block 442, then the next step 444 is to send the disabled antenna direction to the network administrator so that the attacker can be tracked down, and a resolution can be found. The process then proceeds to step 450, wherein the administrator resets the attack condition or establishes that the system is 'all clear' per an established rule. Now that the system is stable and clear, step 452 shows that all the antennas are enabled again. After the antennas are enabled, the process loops back up to the monitoring step 402, via process flow 454, and the collective steps repeat themselves.

The wireless network configurations, systems and methods shown are meant to be representative in their relative layouts and configurations, and other such working arrangements are meant to be included within the scope of the intended examples. This wireless network system and method for mitigating attack signals provides a relatively fast and efficient way to eliminate the effects of signals that might be attacking a wireless network. The antennas can be disabled in the direction of the attacking signal, and the rest of the network can continue to function. The direction of the attacker is determined for further investigation and resolution of the problem. Once the system has stabilized, the antennas can be enabled again. If the problem persists, then further detection efforts can continue, with only the antennas in the general direction of the attacker being affected in the overall wireless network system.

While particular implementations of the present disclosure have been described herein as being applied to wireless network attacks and the mitigation of such effects, persons skilled in the art will appreciate that the methods and systems of present disclosure may be incorporated into wireless networks in general and is not limited to the implementations described above, but may vary based upon the desired application. Persons skilled in the art will also appreciate that the mitigation of wireless attacks can be achieved by similar arrangements that are meant to be included in the scope of the disclosure.

In general, where and if used, terms such as "coupled to," and "configured for coupling to" and "secured to" and "attached to" (for example, a first component is "coupled to" or "is configured for coupling to" or is "secured to" a second component or is "attached to" a second component), or "communicate" (for example, a first component "communicates with" or "is in communication with" a second component) are used herein to indicate a structural, functional, mechanical, electrical, signal, optical, magnetic, electromagnetic, ionic or fluidic relationship between two or more components (or elements, features, or the like). As such, the fact that one component is said to couple (or secure, or attach) to a second component is not intended to exclude the possibility that additional components may be present between, and/or operatively associated or engaged with, the first and second components.

Although the previous description only illustrates particular examples of various implementations, the present disclosure is not limited to the foregoing illustrative examples. A person skilled in the art is aware that the disclosure as defined by the appended claims can be applied in various further implementations and modifications. In particular, a combination of the various features of the described implementations is possible, as far as these features are not in contradiction with each other. Accordingly, the description of implementations has been presented for purposes of illustration and description. Modifications and variations are possible in light of the above description.

What is claimed is:

1. A method for mitigating an unwanted transmission to a wireless network, the wireless network including an antenna array with a plurality of antennas associated with different directions, the antenna array configured to send and receive signals from external devices using established protocols, and a processing device coupled to the antenna array for monitoring and analyzing incoming signals, the method comprising:
   (a) receiving at least one incoming signal at the antenna array from the external devices;
   (b) monitoring and analyzing the at least one incoming signal by monitoring radio frequency (RF) frames for cell entry connection requests or changes;
   (c) determining whether the at least one incoming signal is an anomaly that violates the established protocols;
   if the anomaly is detected, then
   (d) reporting the detected anomaly;
   (e) determining which antenna in the antenna array is receiving the detected anomaly; and
   (f) if an external device, of the external devices sending the detected anomaly, can be identified and blocked, then
      (1) blocking the identified external device, otherwise
      (2) disabling at least one antenna in the antenna array that is receiving the detected anomaly.

2. The method according to claim 1, wherein step (b) includes determining the Internet Protocol (IP) addresses of the external devices.

3. The method according to claim 1, wherein step (c) further comprises:
   comparing the behavior pattern models of individual external devices to unwanted behavior models to determine if an anomaly has occurred.

4. The method according to claim 3, wherein the unwanted behavior models include attack signatures.

5. The method according to claim 1, wherein step (c) further comprises:
   comparing aggregate external device behavior patterns to unwanted behavior models to determine if an anomaly has occurred.

6. The method according to claim 5, wherein the unwanted behavior models include trigger sequences.

7. The method according to claim 1, step (f) further comprising:

(3) waiting an amount of time after disabling the antenna in step (2);
(4) determining if the wireless network has stabilized;
(5) if the wireless network has not stabilized, then continuing to disable the antenna in accordance with step (2).

8. The method according to claim 7, step (f) further comprising:
(6) if the wireless network has stabilized, then determining a direction of the external device that is sending the detected anomaly as derived from a direction of the detected antenna receiving the anomaly;
(7) sending the direction of the sending external device to a wireless network administrator.

9. The method according to claim 8, step (f) further comprising:
(8) waiting for the wireless network administrator to reset anomaly conditions;
(9) enabling the previously disabled at least one antenna in the antenna array;
(10) resume monitoring in step (b).

10. A method for minimizing an unwanted transmission to a wireless network, the wireless network including at least one antenna having beamforming capabilities, the at least one antenna configured to send and receive signals from external devices using established protocols, and a processing device coupled to the antenna for monitoring and analyzing incoming signals, the method comprising:
(a) receiving at least one incoming signal at the least one antenna from the external devices;
(b) monitoring and analyzing the at least one incoming signal;
(c) determining whether the at least one incoming signal is an anomaly that violates the established protocols;
if the anomaly is detected, then,
(d) logging the detected anomaly and reporting the detected anomaly;
(e) using the beamforming capabilities of the antenna to determine a direction of the external device that is sending the anomaly; and
(f) if an external device, of the external devices sending the anomaly, can be identified and blocked, then
(1) blocking the identified external device; and
(2) disabling a receiving of incoming signals in a direction of the detected anomaly using the beamforming capabilities of the at least one antenna;
(3) waiting an amount of time after disabling the antenna in the direction of the detected anomaly in step (2);
(4) determining if the wireless network has stabilized;
(5) if the wireless network has not stabilized, then continuing to disable the antenna in the direction of the detected anomaly in accordance with step (2);
(6) if the wireless network has stabilized, then
(i) sending the direction of the external device to a wireless network administrator;
(ii) waiting for the wireless network administrator to reset anomaly conditions;
(iii) enabling the previously disabled beamforming antenna in the direction of the detected anomaly;
(iv) resume monitoring in step (b).

11. The method according to claim 10, wherein step (c) further comprises:
comparing the behavior pattern of individual external devices to unwanted behavior models to determine if an anomaly has occurred.

12. The method according to claim 11, wherein the unwanted behavior models include attack signatures.

13. The method according to claim 11, wherein step (c) further comprises:
comparing aggregate external device behavior patterns to unwanted behavior models to determine if an anomaly has occurred.

14. The method according to claim 13, wherein the unwanted behavior models include trigger sequences.

15. A system for mitigating the reception of unwanted signals in a wireless network from external devices, the system comprising:
an antenna array having a plurality of individual antennas, with each individual antenna associated with a different signal direction, and at least one antenna for receiving incoming signals associated with a transmission direction;
a mechanism for disabling at least a portion of the at least one antenna associated with the transmission direction; and
a processor coupled to the at least one antenna for analyzing the incoming signals, the analysis including behavior patterns of the external devices; and
a storage device for storing behavior patterns of the external devices and signature patterns of unwanted signals,
wherein the behavior patterns of the external devices are compared to the signature patterns of the unwanted signals to determine if an anomaly has occurred, and if the anomaly is detected, then at least a portion of the at least one antenna is disabled in a direction associated with the detected anomaly.

16. The system of claim 15, wherein the portion of the at least one antenna is disabled for an amount of time until the wireless network has stabilized and the detected anomaly is no longer being received.

17. The system of claim 16, wherein the behavior patterns of the external devices include known attack signatures.

18. A system for mitigating the reception of unwanted signals in a wireless network from external devices, the system comprising:
at least one antenna for receiving incoming signals associated with a transmission direction having beam forming capabilities for selectively receiving signals in different directions;
a mechanism for disabling at least a portion of the at least one antenna associated with the transmission direction;
a processor coupled to the at least one antenna for analyzing the incoming signals, the analysis including behavior patterns of the external devices; and
a storage device for including behavior patterns of the external devices and signature patterns of unwanted signals,
wherein the behavior patterns of the external devices are compared to the signature patterns of the unwanted signals to determine if an anomaly has occurred, and if the anomaly is detected, then at least a portion of the at least one antenna having beam forming capabilities is disabled in the direction associated with the detected anomaly.

* * * * *